Patented May 5, 1925.

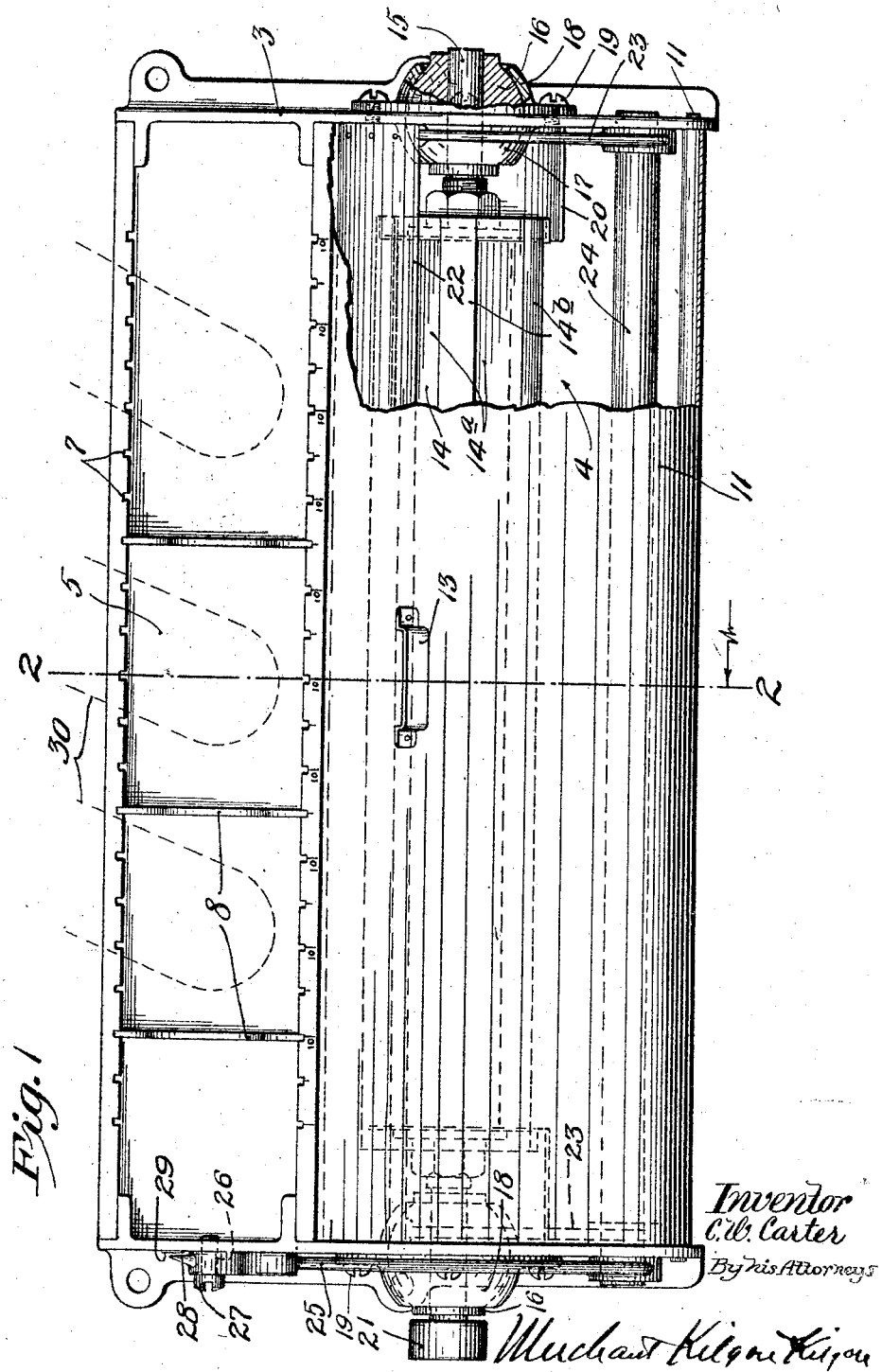

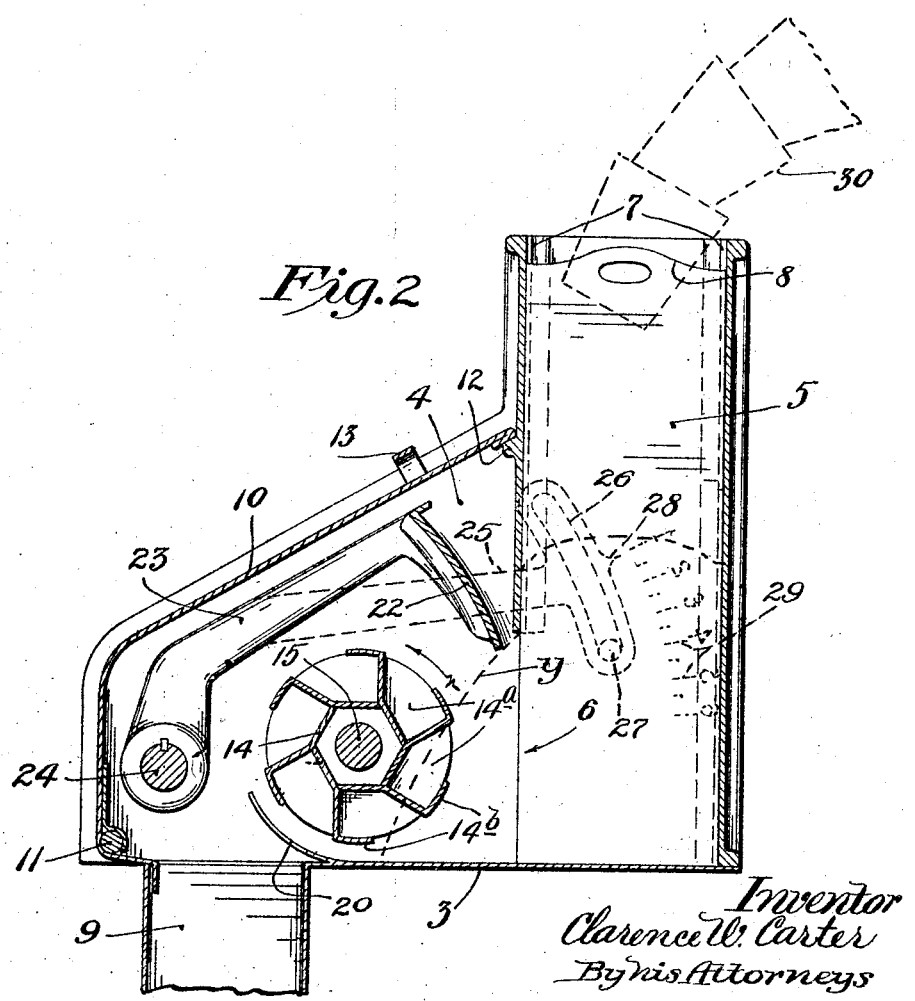

1,536,073

UNITED STATES PATENT OFFICE.

CLARENCE W. CARTER, OF MINNEAPOLIS, MINNESOTA, ASSIGNOR TO CARTER-MAYHEW MANUFACTURING COMPANY, OF MINNEAPOLIS, MINNESOTA, A CORPORATION OF MINNESOTA.

PERCENTAGE FEEDER.

Application filed July 29, 1921. Serial No. 488,377.

*To all whom it may concern:*

Be it known that I, CLARENCE W. CARTER, a citizen of the United States, residing at Minneapolis, in the county of Hennepin and State of Minnesota, have invented certain new and useful Improvements in Percentage Feeders; and I do hereby declare the following to be a full, clear, and exact description of the invention, such as will enable others skilled in the art to which it appertains to make and use the same.

My present invention provides an extremely simple and highly efficient percentage feeder, adapted to feed and commingle various different kinds of materials, such, for example, as different grades of flour, different kinds of grains and coffee, different grain substances for stock food or chicken feed, and different kinds of dry fertilizer. The feeder is especially adapted for use for feeding and mixing or blending different kinds of grades of flour and grain.

A commercial form of the improved percentage feeder is illustrated in the accompanying drawings, wherein like characters indicate like parts throughout the several views.

Referring to the drawings:—

Fig. 1 is a plan view of the feeder, some parts being broken away and some parts being sectioned; and Fig. 2 is a section on the line 2—2 of Fig. 1.

The feeder involves a suitable casing 3, preferably, having a flat bottom, and divided into two compartments, 4 and 5, with a large feed passage 6 extended upward from the bottom of the casing and connecting said compartments. This passage 6, from end to end, has a constant height or distance from the bottom. The compartment 5 should be and is, a rectangular compartment and its walls are formed with opposing vertically extended notches 7 spaced longitudinally of said compartment 5 and adapted to receive dividing partitions 8.

The compartment 4 has a depending discharge or commingling spout 9, the upper portion of which extends, nearly or quite, from side to side of the casing, or from end to end of said compartment 4. The upper plate of the compartment 4 is in the form of a displaceable cover 10 mounted on a pivot rod 11, located near the bottom of the casing. The free end of the cover 10 rests loosely on the stop ledge 12, (see Fig. 2); and as shown, said cover has a handle 13.

Working in the lower portion of the compartment 4, between the feed passage 6 and discharge spout 9, is a pocket-equipped feed roller 14 secured on a shaft 15. The ends of the shaft 15 extend through the sides of the casing, and as shown, are journaled in self-adjusting bearings 16, the spherical outer surfaces of which are mounted in bearing sockets 17—18. The socket sections 17 are shown as formed integral with the end plate of the casing, while the socket sections 18 are detachably secured thereto by machine screws 19 or the like.

The feed roller 14 extends less than from end to end of the compartment 4, and is formed with circumferentially spaced longitudinally extended pockets 14$^a$ which have outer edge flanges 14$^b$ projecting in the direction of rotation of said feed roller.

When grain, flour or the like is filled into the compartment 5, it will spread out on the bottom of the casing and through the passage 6, substantially as indicated by the dotted line Y on Fig. 2, and will run into the adjacent pockets of the feed roller so that it will be picked up by the feed roller when the latter is rotated in an anti-clockwise direction, in respect to Fig. 2. To prevent the grain, flour or other material from running into the discharge spout 9, at the spaces between the sides of the casing and the ends of the feed roller, upwardly curved or bent detaining flanges 20 are secured to the bottom of the casing, as shown in the drawings.

The roller shaft 18 projects at one end and is provided with a pully 21 over which a power-driven belt, not shown, may run to impart rotary motion to the feed roller.

The numeral 22 indicates a curved cut-off blade that extends nearly from end to end of the compartment 4 and is adjustably mounted in the space between the feed roller and the upper portion of the feed passage 6. This cut-off blade is secured to a pair of parallel arms 23, which, in turn, are secured to a rock shaft 24, located in front of the feed roller and journaled in the sides of the casing 3. At one projecting end, the rock shaft 24 has a projecting arm 25, the head of which is formed with a segmental slot 26 extended on the arc of a circle whose center is the axis of the shaft 24. A screw 27 works through the slot 26, and is screwed into the adjacent side of the casing and serves to secure said arm 25, and hence, the cut-off blade 22 set in various different adjustments.

For indicating definite different adjustments of the cut-off blade 22, the head 25 is shown as provided with a pointer lug or projection 28 that co-operates with graduation marks 29 on the adjacent side of the casing.

In the drawings, the numeral 30 indicates flexible supply spouts that deliver into different pockets or sub-divisions of the main supply compartment 5.

Preferably, the notches 7, or at least one row thereof, is marked with numerals indicating the value, in containing capacity, of the compartment 5, represented by the distances between notches. As is evident, when the feed roller is rotated as indicated by the arrow marked adjacent thereto, in Fig. 2, it will dig into the bank of grain or material that constantly runs against the same and will carry the same over and discharge it into the spout 9, where the several kinds of grain or materials will be commingled in the desired proportionate blend. It is evident that by shifting the partitions 8, the containing capacity of the pockets or sub-divisions of the supply compartment 5 may be varied, at will, and it is also evident that these partitions proportionately divide the feed passage 6. Hence, it follows that by the proper setting of the partitions, the feeder may be set for feeding various different kinds of grain, flour or materials in any desired proportions.

The total amount of material fed by the feed roller per unit of rotation, may be varied, at will, by adjustments of the cut-off blade 13, it being obvious that increased feed will be produced by upward adjustments of said blade, and decreased feed will be produced by downward adjustments of said blade. To sum up, the proportionate feeding of material depends entirely on the adjustments of the partitions 8, while the total or aggregate feed depends entirely upon the adjustment of the cut-off blade, and either adjustment may be accomplished without affecting the other.

This improved percentage feeder is of simple construction but efficient for the purposes had in view. Its running parts are reduced to a minimum since it has but one rotating part, towit, the feed roller. It may, of course, be made in different sizes and the designs and construction thereof, varied for the different kinds of work that it is to perform.

What I claim is:—

A percentage feeder comprising a long substantially horizontal feed roller having circumferentially spaced compartments extending approximately from end to end thereof, a supply compartment approximately co-extensive with said feed roller and having a discharge passage located entirely at one side of said roller but so closely adjacent thereto that said roller will intersect the angle of repose of material flowing from said feed passage, said supply compartment having partitions for proportionately dividing the same into sub-compartments, all of which deliver through the said feed passage and against one side of said roller, said roller being rotated in a direction to pick up and carry over the stock delivered thereto and to discharge the materials from the several sub-compartments in a common stream, and a common gate working between said supply compartment and feed roller, said gate being approximately co-extensive with said roller and operating simultaneously to vary the flow to said feed roller from the several sub-compartments from said supply compartment.

In testimony whereof I affix my signature.

CLARENCE W. CARTER.